Patented Nov. 26, 1929

1,737,475

UNITED STATES PATENT OFFICE

ERNST ROTHLIN AND FRITZ MÜLLER, OF BASEL, SWITZERLAND, ASSIGNORS TO THE FIRM OF CHEMICAL WORKS FORMERLY SANDOZ OF BASEL, SWITZERLAND

DERIVATIVE OF THIAZINES

No Drawing. Application filed December 16, 1927, Serial No. 240,619, and in Switzerland December 29, 1926.

It has been found that valuable derivatives of thiazines can be obtained if the same are combined with bile acids to form new salts. The following bile acids come into consideration for the present purpose: the unsaponified original acids contained in the gall, such as glycocholic and taurocholic acid, further the products of saponification of same, such as cholic and desoxycholic acid, further also products of transformation of cholic acid, such as dehydrocholic and apocholic acid. The thiazines may be tetramethyldiaminophenthiazine, diaminophenthiazine and its derivatives obtained by introducing radicals and atoms into the aromatic nuclei as well as into the aminogroups, for instance, halogene, alkyl or alkoxy-derivatives of diaminophenthiazine.

These bile acid salts of thiazines may be prepared in a known manner by interaction of the bases and the acids or by double decomposition of suitable salts of the substances.

These new salts possess a stronger antiparasitic action than the known salts of thiazines. They constitute deep blue to violet bronzy powders, crystallized or amorphous, easily soluble in alcohol and methanol, difficulty soluble in hot water and ether.

Examples 1. 3,2 g. of tetramethyldiaminophenthiaziniumhydrochloride are dissolved in 60 ccm. of water and poured while stirring into a solution of 4,5 g. of sodium cholate in 80 ccm. of water. The new salt precipitates as an amorphous deposit. It may be crystallized from hot water in the form of blue crystal needles. It is difficultly soluble in cold, less difficultly soluble in hot water. Alcohol readily dissolves the salt; it is nearly insoluble in ether.

Analysis:

0,2536 g. neutralized 10,85 ccm. of 1/10 n $H_2SO_4$

Calculated for $C_{40}H_{58}O_5N_3S$ _____ N=6,07%
Found _____ 5,99.

The salt obtained according to this example has the following formula:

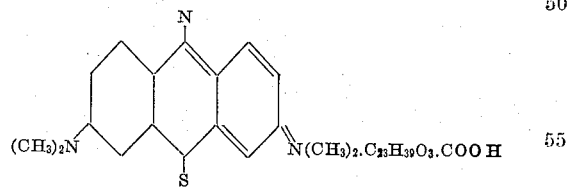

2. 3,2 g. of tetramethyldiaminophenthiaziniumhydrochloride and 4,5 g. of sodium desoxycholate are allowed to interact as described in Example 1. The new salt precipitates and may be purified by dissolution in alcohol and precipitation with ether. The solubility properties are nearly the same as those of the product of Example 1. It forms a violet bronzy glossy powder.

Analysis:

0,2108 g. neutralized 9,4 ccm. 1/10 n $H_2SO_4$

Calculated for $C_{40}H_{58}N_3O_4S$__N=6,21; 6,21%
Found _____ 6,26.

The salt obtained according to this example has the following formula:

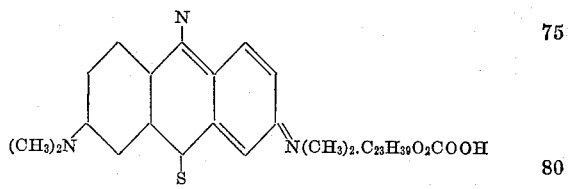

What we claim is:

1. As new articles of manufacture the herein described thiazine salts of bile acids constituting deep blue to violet bronzy powders, crystallized or amorphous, easily soluble in alcohol and methanol, difficultly soluble in hot water and ether.

2. As new articles of manufacture the herein described thiazine salts of saponified bile acids, constituting deep blue to violet bronzy powders, crystallized or amorphous, easily soluble in alcohol and methanol, difficultly soluble in hot water and ether.

3. As new articles of manufacture the herein described thiazine salts of cholic acid, constituting deep blue to violet bronzy powders, crystallized or amorphous, easily soluble in alcohol and methanol, difficultly soluble in hot water and ether.

4. As a new article of manufacture the herein described salt of cholic acid and tetramethyldiaminophenthiazine constituting deep blue crystal needles, easily soluble in alcohol and methanol, difficultly soluble in hot water and ether.

In witness whereof we have hereunto signed our names this 1st day of December 1927.

ERNST ROTHLIN.
FRITZ MÜLLER.